United States Patent Office 2,981,912
Patented Apr. 25, 1961

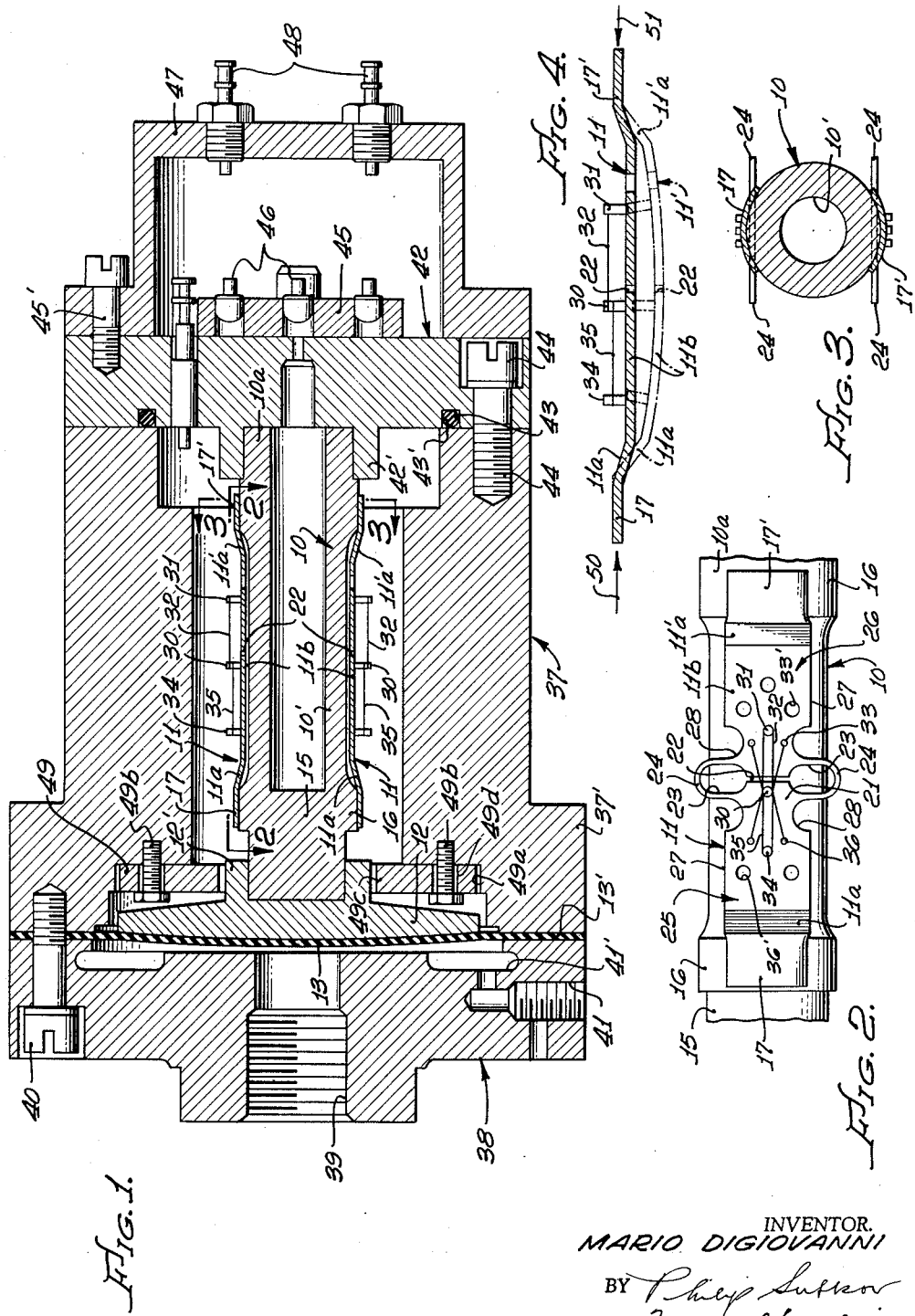

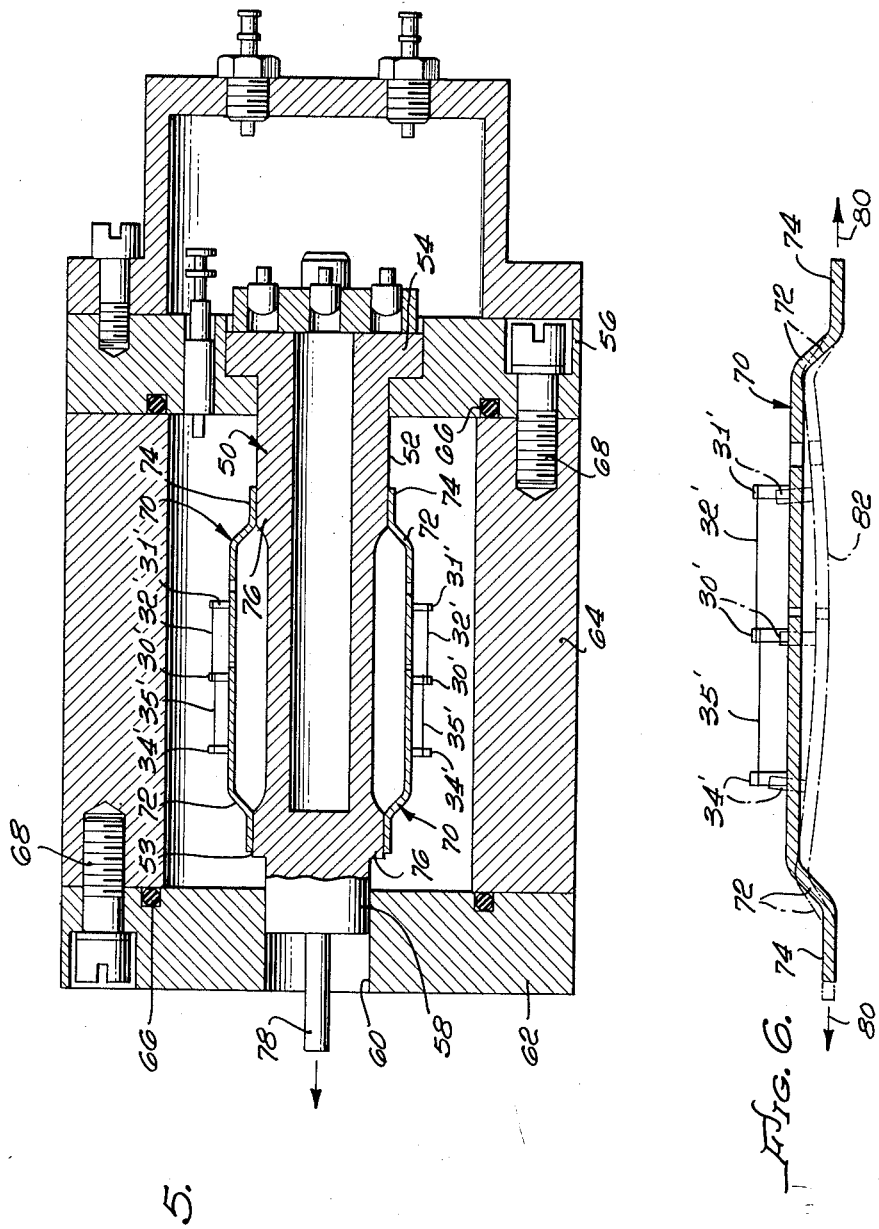

2,981,912

TRANSDUCER

Mario Di Giovanni, Pacific Palisades, Calif., assignor to Statham Laboratories, Inc., Los Angeles, Calif., a corporation of California Filed Sept. 30, 1959, Ser. No. 843,568

5 Claims. (Cl. 338—4)

This application is a continuation-in-part of my copending application Serial No. 762,486, filed September 22, 1958.

This invention relates to a transducer or load cell capable of measuring force such as pressure or acceleration, or displacement.

Conventional load cells have a strain column which is placed under tension or compression by a force summing member, causing the strain column to be either stretched or compressed by the applied force. The resulting displacement of the strain column corresponding to the magnitude of the force applied is sensed by a motion sensing device.

Since the cross-sectional area of the strain column changes during stretching or compression of the strain column, the deflection of the strain column against applied load deviates more and more from a linear relation as the load increases and the cross-section of the strain column decreases or increases, depending on whether the strain column is under tension or compression. The result is that the response becomes more and more nonlinear with increasing loads, requiring close calibration of the instrument to obtain accurate readings.

An improved form of load cell is described in my above copending application. However, as aforementioned, such load cell, employing an axially deformable armature, has a nonlinear response for reasons noted above, namely due to change in the cross-sectional area of the strain column when it is deformed by application of a force. Thus, when the strain column is compressed, the cross sectional area and rigidity of the column increases with increase in load and a greater compressive force is required to produce a unit of displacement as compared to the force previously required to produce the same displacement. When the strain column is placed under tension, the cross sectional area of the column decreases with increase in load, and a reduced tensile force is required to produce a unit of displacement of the column as compared to the force previously required to produce the same displacement. While the effects of nonlinearity in the instrument of my above copending application are relatively small, the use of such an instrument is precluded where extremely high accuracy, e.g. 0.10% or less, is demanded, which is required in many modern applications.

It is an object of this invention to design a transducer or load cell having a substantially linear response with the application of force, pressure, or acceleration.

Another object is to design a load cell having a strain column and a deformable armature, said armature being compensated in a simple manner for deviation in deflection of the strain column from a linear relation with respect to the applied load, as the load on the column changes.

Other objects and advantages will appear or be obvious from the following description of the invention.

The instant invention is based on the discovery that in a load cell comprising a deformable armature, a strain column, the armature being connected at spaced points to the strain column along its longitudinal axis, wire connections or pins mounted on the armature in alignment with the axis of said strain column, and a strain wire stretched in tension between said wire connections, if the armature is designed such that it becomes eccentrically loaded by the applied force to cause secondary bending in the armature in a direction at an angle, e.g. substantially normal, to the axis of the strain column, the resulting deflection of the armature produces a rocking motion of the wire connections or pins, and such motion of the wire connections produces a change in tension in the strain wire which has a compensating effect, resulting in a substantially linear output from the load cell.

Thus, according to one embodiment, the device comprises a strain column and an armature positioned over the strain column, the armature being connected to the strain column at spaced points axially of the column, the armature between such spaced points being spaced radially of the column to permit the center portion of the armature to move freely with respect to the column. The armature has an arcuately slotted intermediate portion to permit the armature to readily deform in a direction axially of the column on application of a force thereto. Spaced wire connections are mounted on the armature on a line parallel to the axis of the armature, and on opposite sides of the slotted portion of the armature. An electrical resistance strain wire is connected to the wire connections. According to the invention, the armature is designed with bent offset portions on opposite sides thereof beyond the wire connections, causing the armature to bend in a direction toward the axis of the strain column, as well as to deform axially of the column, on application of an axial compressive force to the column. Preferably a pair of such armatures and associated wire connections and strain wires are employed, said armatures being positioned diametrically opposite each other on the strain column.

Such bending of the armature normal to the strain column (secondary bending of the armature) results in rocking motion of the wire connections toward each other. Since the strain wire in such embodiment is initially wound near the maximum safe tension and relaxes under compression of the column, the aforementioned secondary bending of the armature and resulting motion of the wire connections toward each other accelerates relaxation of the strain wire beyond the normal change in relaxation thereof due to the compressive force, thus compensating for the increasing rigidity of the column under increasing compressive force. The result is a substantially linear output on change of applied load.

Where the instrument is designed as a tensiometer, the bent offset portions of the armature are designed so that the armature is bent in a direction normal to the axis of the strain column, as well as axially of the column, on application of tension to the column. The armature and the offset portions are designed so that bending of the armature rocks the wire connections toward each other. This tends to reduce or decelerate the tension on the wires an amount to compensate for accelerated elongation of the strain column as result of increased tensile load, resulting in a linear response.

The invention will be more clearly understood by reference to the following description of the invention, taken in connection with the accompanying drawing wherein:

Fig. 1 is a longitudinal section through a compression type load cell;

Fig. 2 is a plan view of one of the armatures mounted on the strain column of Fig. 1, taken on line 2—2 of Fig. 1;

Fig. 3 is a section taken on line 3—3 of Fig. 1;

Fig. 4 is a schematic illustration showing the effect on the armatures in Fig. 1 of the application of a compressive force to the strain column;

Fig. 5 is a longitudinal section through a modified tension type load cell; and

Fig. 6 is a schematic illustration showing the effect on the armatures in Fig. 5 of a force applied in tension to the strain column of Fig. 5.

Referring to Figs. 1 to 4 of the drawings, the instrument is composed of a strain column 10 which is of elongated cylindrical shape and which is hollow along its major portion, as indicated at 10'. Over the strain column are positioned in diametrically opposite relation a pair of like armatures 11 which are each mounted on the strain column at the ends of the armature. On one end of the strain column is positioned an integral block portion 15 on which is mounted a piston 12, the piston having a flange 12' which is fastened, for example, by force fitting or by brazing, about the end block 15 of the strain column. Connected to the outer face of the piston 12 by suitable means such as brazing is a diaphragm 13, the outer periphery 13' of the diaphragm being clamped between the case 37 and pressure head 38. The piston 12 and diaphragm 13 together constitute a force collector or force summing means which transmits an applied force to the strain column.

Since each of the armatures 11 are identical, a description of one of such armatures will suffice, the same numerals being employed to represent identical corresponding parts on each armature. The armatures 11 are each essentially in the form of a flat elongated metal strip. Arcuately shaped flanges 17 and 17' are integrally connected to the opposite ends of the armature, and such flanges are connected as by welding to the opposite cylindrical shoulders 16 on the outer surface of the strain column 10. A pair of offset portions 11a and 11'a integrally connect the arcuate flanges 17 and 17' respectively of the armature with the flat central portion 11b of the armature. Each of said offset portions is bent inwardly at an angle to the axis of the strain column 10, as clearly seen in Fig. 1.

The armatures 11 each have a central slotted portion 21 having a central slot 22 which is positioned substantially normal to the longitudinal axis of the armature. At the opposite ends of slot 22 are formed enlarged apertures 23, leaving a narrow metal bridge 24 across the central slotted portion 21 of the armature and connecting the two opposite end portions 25 and 26 of armature 11. It will be noted that metal strips 24 extend outwardly from the adjacent longitudinal edges 27 of the armature, and notches 28 are formed in armature portions 25 and 26 adjacent the strips 24. Thus it will be seen that while slotted portion 21 of the armature permits axial displacement of one end portion 25 of the armature with respect to the other end portion 26, the provision of the outwardly extending metal strips 24 and the notches 28 provide stiffness in the armature adjacent its slotted portion to prevent lateral displacement of the armature portions 25 and 26.

Mounted on armature portion 25 adjacent the narrow slot 22 is a pin 30, and disposed on armature portion 26 on the opposite side of slot 22 is a pin 31. A strain wire 32 is mounted in tension on pins 30 and 31, the ends of the strain wire being connected to terminal pins 33. Another pin 34 is mounted on armature portion 25 of the armature and spaced from pin 30. A wire 35 is looped between pin 30 and pin 34, the ends of the strain wire being connected to terminal pins 36. Strain wire 32 is an active wire, and wire 35 is inactive and is not initially mounted in tension. Pins 30, 31 and 34 are all positioned centrally of the armature on a line parallel to the longitudinal axis of the strain column 10. Terminal pins 33 and 36 are in turn connected by leads (not shown) to the terminals 33' and 36', respectively, on the armature.

The transducer is mounted in a case 37 and a pressure head 38 is connected to one end of the case 37 by means of screws 40, the pressure head 38 and end flange 37' of case 37 clamping the force collector 14 in position. Pressure head 38 has an inlet 39 which communicates with the diaphragm 13 of the force collector. In the pressure head is a threaded bleed valve 41 which communicates via passages 41' with the space adjacent the diaphragm 13.

At the opposite end of the case 37 is mounted a cap 42 by means of the screws 44, there being a ring seal 43 disposed in a recess 43' between the case and the cap 42. The cap 42 carries an inwardly extending flange 42' which receives the end 102 of the strain column 10 and holds it in position by a force fit or by welding the engaging surfaces. It is thus seen that end 10a of the strain column remains fixed while the opposite end of 10 carrying block 15 is displaced relative to end 10a on application of a force to the strain column by the force collector 14.

A terminal plate 45 is mounted on the cap 42, and on said terminal plate are a number of terminals 46 to which are connected leads (not shown) which are also attached to the terminals 33' and 36'. Mounted on the cap 42 by means of the screws 45' is a cover 47 having connected thereto external terminals 48.

The strain wires 32 and 35 are connected in a bridge circuit in a well understood manner. The strain wires 32 are the active arms of the bridge, and the strain wires 35 are the inactive arms of the bridge.

A stay plate 49 is mounted in a recess 49a of flange 37' by means of screws 49b. The stay plate 49 has a central aperture 49c which receives the flange 12' with sufficient clearance to permit axial motion of flange 12' but preventing any undue lateral motion thereof. Oversize holes 49d are provided for screws 49b to permit adjustment of the plate.

From the above, it will be seen that when a positive pressure is applied to the diaphragm 13, the strain column 10 will be displaced to the right as viewed in Fig. 1. This results in a compression of the strain column and also a compression of the armatures 11 carried by the strain column. This produces a movement of armature portion 25 toward portion 26 and a relaxation and change in resistance of the active strain wires 32 occurs proportional to the force compressing the strain column.

However, simultaneously with displacement of the armature 11 to the right, due to the downwardly bent offset portions 11a and 11'a of the armature, the armature will become eccentrically loaded as result of the applied and reacting forces indicated by arrows 50 and 51, respectively, in Fig. 4. These forces are applied to the flanges 17 and 17' at the ends of the armature, in a direction parallel to the axis of the strain column. The eccentric loading of the armature 11 due to the compressive force applied against the strain column 10 causes the armature to bend concavely inward toward the axis of the strain column, as indicated by the dotted line 11', producing a rocking of the pins 31 and 34 equally towards each other, and toward the central pin 30, as indicated in dotted lines in Fig. 4. Thus, it will be seen that the relaxation of the active strain wire 32 is accelerated as the strain column increases in rigidity as the load increases. The result is a compensating effect for the non-linearity of the ratio of deflection to applied force on the strain column as the load on the strain column increases. The measured output from the bridge caused by the applied load is also accordingly made linear.

It is thus seen, viewing Fig. 4, that the bent offset portions 11a and 11'a of each of the armature plates 11 are sufficiently resilient to bend and to tend to produce secondary bending of the armature in a direction normal to the axis of strain column 10, and the armature plates 11 are each sufficiently stiff to undergo secondary bending, as indicated by dotted 11', in response to such bending of the offset portions 11a and 11'a. The production of such secondary bending of each of the armature plates, simultaneously with axial displacement thereof on application of an axial force to the strain column, is faciliated by the preferred use of a pair of armature plates, as previously noted on diametrically opposite sides of the strain column.

It will be noted in Fig. 4 that since wires 35 are inactive and not initially under tension, the rocking of pin 34 toward the central pin 30, as result of the secondary bending indicated at 11' of the armature, simply causes further relaxation of wires 35 and does not adversely affect the accuracy of response.

It will be understood that substantially all of the applied force being measured is exerted against the strain column 10 to produce compression thereof, and only an insignificant amount of the applied force is required to simultaneously displace the armature in the manner described above.

Also, it will be understood that a similar compensating effect to produce a linear output is realized employing the principles of the invention for producing a tension type load cell, except that the applied forces operate in reverse from those described above. An embodiment of this modification is illustrated in Figs. 5 and 6.

Referring to Figs. 5 and 6, numeral 50 is a strain column having spaced shoulders 52 and 53 thereon. One end of the column has a flange 54 which is fixed in a rigid block 56. The other end portion 58 of the column is slidably received in an aperture 60 formed in a plate 62, said aperture serving as a guide for longitudinal or axial displacement of member 58 and the column 50.

Block 56 and plate 62 are mounted at opposite ends on a cylindrical case 64 by means of screws 68, ring seals 66 being clamped between the block and plate, and the adjacent case 64. Members 56, 62 and 64 form the frame in which the column 50 is mounted.

A pair of like armatures 70 are positioned diametrically opposite each other on the strain column. Armatures 70 are each slotted and constructed substantially the same as armatures 11 described above, except that each of armatures 70 has a pair of spaced apart offset portions 72 near the opposite ends of the armature, which offset portions are bent outwardly at an angle to the axis of the strain column instead of inwardly thereto, as in the case of armatures 11. The outwardly extending flanges 74 connected to said offset portions 72 at opposite ends of the armature are connected as by welding to the opposite cylindrical shoulders 52 and 53 on the strain column 50.

Pins 30', 31' and 34' are mounted on armatures 70 in the same manner and in corresponding location as pins 30, 31 and 34 respectively are mounted on armatures 11. A strain wire 32' is mounted in tension between pins 30' and 31' of the armatures 70, and a wire 35' is mounted on pins 30' and 34' of armatures 70, strain wires 32' being active and wires 35' being inactive as in the case of wires 32 and 35, respectively.

When a load is applied in tension in the direction of the arrow in Fig. 5, to the rod 78 axially connected to the end portion 58 of the column 50, the strain column will be displaced to the left as viewed in Fig. 5. This results in tensioning the strain column and the armatures 70 carried by the column, since the opposite end 52 of the column is fixed to the rigid block 56. This produces a stretching and displacement of the slotted armatures 70 outwardly; that is, the left portion of each of armatures 70 moves away from the right portion of armatures 70, viewing Fig. 5, causing an increase in resistance of the active strain wires 32' proportional to the tension load applied.

Simultaneously with displacement of the armatures 70 to the left, the outwardly bent offset portions 72 of the armature cause the armature to become eccentrically loaded as result of the applied and reacting forces indicated by arrows 80 in Fig. 6. Such eccentric loading of the armatures 70 due to the tensile force or load, applied to the strain column 50, causes the armatures 70 to bend concavely inward, as indicated by the dotted lines at 82 in Fig. 6, producing a rocking of the pins 31' and 34' towards each other and toward the central pin 30', also indicated in dotted lines in Fig. 6. This causes a relaxation of the tension in the active strain wires 32', which relaxation is accelerated as the strain column is increasingly tensioned and its cross-sectional area increasingly reduced as the load increases. This produces a compensating effect for the nonlinearity of the ratio of deflection to applied force on the strain column as the load increases, to thereby cause the strain wires 32' to be tensioned linearly with respect to applied load.

As above described with respect to Fig. 1, it is noted that the relaxation in tension of the inactive wires 35' has no effect on the output, since these wires were not initially wound under tension.

While I have shown the use of two diametrically positioned like armatures, e.g. 11, it will be understood that I may employ a single cylindrical slotted armature mounted entirely about the strain column, the bent offset portions corresponding to 11a and 11'a extending entirely around the armature.

Also, if desired, the strain column can be in the form of a tube, and the armature can be mounted within the strain tube and connected at spaced axial points to the tube.

Although I prefer to apply the invention principles to use of an unbonded strain wire, I can also employ strain wires which are bonded to the armature, omitting wire connections or pins. In this modification, the strain wires will bend with the secondary bending of the armature to produce the desired linearity of response.

While I have described particular embodiments of my invention for the purpose of illustration, it should be understood that various modifications and adaptations thereof may be made within the spirit of the invention as set forth in the appended claims.

I claim:

1. A transducer which comprises a strain member, an armature connected to said strain member at spaced points axially of said member, said armature between said spaced points being spaced radially of said strain member, said armature having a slotted portion including an arcuate slot located between said spaced points, spaced wire connections on said armature on opposite sides of the slotted portion of said armature, an electrical resistance strain wire connected to said wire connections, said armature having offset portions each bent at an angle to the axis of said strain member, said offset portions being located on opposite sides of said slotted armature portion, said offset portions having sufficient resilience to undergo bending on application of a force axially of said strain member, and said armature having a stiffness such that it bends in a direction normal to the axis of said strain member in response to bending of said offset portions, and a force collector connected to said strain member, so that on axial displacement of said strain member on application of an axial force thereto, said armature bends in a direction substantially normal to the axis of said member, producing a rocking of said wire connections with respect to each other, to change the tension in said strain wire and compensate for change in cross-sectional area of said strain member with change in applied load.

2. A transducer which comprises a strain column, an armature connected to said strain column at spaced points axially of said column, said armature between said spaced points being spaced radially of said column, said armature having an arcuately slotted portion intermediate said spaced points, spaced wire connections on said armature disposed axially thereof on opposite sides of the slotted portion of said armature, an electrical resistance strain wire connected to said wire connections, said armature having bent offset portions on opposite sides beyond said wire connections, said offset portions having sufficient resilience to undergo bending on application of a force axially of said strain column, and said armature having a stiffness such that it bends in a direction normal to the axis of said strain column in response to bending of said offset portions, so that on axial displacement of said strain column on application of an axial force thereto, said armature bends in a direction substantially normal to the axis of said column, producing a rocking of said wire connections with respect to each other, to change the tension in said strain wire and compensate for change in cross-sectional area of said strain column with change in applied load.

3. A transducer which comprises a strain column, a pair of like armatures disposed at diametrically opposite positions on said strain column, each of said armatures being connected to said strain column at spaced points axially of said column, said armatures between said spaced points being spaced radially of said column, said armatures each having an arcuately slotted portion intermediate said spaced points, spaced wire connections on each of said armatures disposed axially thereof on opposite sides of the slotted portion of said armatures, an electrical resistance strain wire connected to said wire connections on each of said armatures, said armatures each having bent offset portions on opposite sides thereof beyond said wire connections, said offset portions having sufficient resilience to undergo bending on application of a force axially of said strain column, and each of said armatures having a stiffness such that it bends in a direction normal to the axis of said strain column in response to bending of said offset portions, so that on axial displacement of said strain column on application of an axial force thereto, said armatures each bend in a direction substantially normal to the axis of said member, producing a rocking of said wire connections with respect to each other, to change the tension in said strain wires and compensate for change in cross-sectional area of said column with change in applied force.

4. A transducer which comprises a strain column, an armature in the form of an elongated metal plate positioned over said column, flanges integrally connected to opposite ends of said armature, said flanges being connected to said strain column at spaced positions axially of said column, said armature having a slotted central portion including an arcuate slot, said armature having a pair of offset portions each integrally connecting one of said flanges with said central portion of said armature, each of said offset portions being bent at an angle to the axis of said column, said offset portions having sufficient resilience to undergo bending on application of a force axially of said strain column, and said armature having a stiffness such that it bends in a direction normal to the axis of said strain column in response to bending of said offset portions, pins on said armature disposed on opposite sides of said slot and positioned on a line substantially parallel to the axis of said column, an unbonded electrical resistance strain wire connected to said pins, and a force collector connected to one end of said column, so that, on axial displacement of said strain column on application of an axial force thereto, the central portion of said armature between said offset portions bends in a direction at an angle to the axis of said column, producing a rocking of said wire connections with respect to each other, to change the tension in said strain wire and compensate for change in cross-sectional area of said column with change in applied force.

5. A transducer which comprises a strain column, a pair of shoulders on opposite end portions of said strain column, a pair of armatures, each of said armatures being in the form of an elongated metal plate positioned over said column at diametrically opposite portions thereon, flanges integrally connected to opposite ends of each of said armatures, said flanges being positioned over and connected to said shoulders, said armatures extending longitudinally of said column, said armatures having a slotted central portion including an intermediate slot located in a plane substantially normal to the axis of said column, said armatures each having a pair of offset portions each integrally connecting one of said flanges with said central portion of each of said armatures, each of said offset portions being bent at an angle to the axis of said column said offset portions having sufficient resilience to undergo bending on application of a force axially of said strain column, and each of said armatures having a stiffness such that it bends in a direction normal to the axis of said strain column in response to bending of said offset portions, pins on each of said armatures disposed intermediate said offset portions on opposite sides of said slot and positioned on a line substantially parallel to the axis of said column, an unbonded electrical resistance strain wire connected to said pins on each of said armatures, and a force collector connected to one end of said column, so that, on axial displacement of said strain column on application of an axial force thereto, the central portion of said armature between said offset portions bends in a direction substantially normal to the axis of said column, producing a rocking of said pins with respect to each other, to change the tension in said strain wire and compensate for change in cross-sectional area of said column with change in applied force.

References Cited in the file of this patent
UNITED STATES PATENTS
2,920,299    Lent ------------------ Jan. 5, 1960